(12) United States Patent
Beer

(10) Patent No.: US 6,355,732 B1
(45) Date of Patent: Mar. 12, 2002

(54) PEEL SEAL BLEND OF 1-POLYBUTYLENE, M-LLDPE AND LDPE WITH HIGH HOT TACK

(75) Inventor: Jeffrey Scott Beer, Perkiomenville, PA (US)

(73) Assignee: Fres-Co System USA, Inc., Telford, PA (US)

( * ) Notice: Subject to any disclaimer, the term of this patent is extended or adjusted under 35 U.S.C. 154(b) by 0 days.

(21) Appl. No.: 09/687,630

(22) Filed: Oct. 13, 2000

(51) Int. Cl.[7] .......................... C08L 23/00; C08L 23/04
(52) U.S. Cl. .................. 525/191; 525/240; 524/442; 524/448; 428/500; 428/515; 428/516; 428/518
(58) Field of Search ................. 525/191, 240; 524/442, 448; 428/500, 515, 516, 518

(56) References Cited

U.S. PATENT DOCUMENTS

| | | | |
|---|---|---|---|
| 4,252,846 A | 2/1981 | Romesberg et al. | 428/35 |
| 4,584,201 A | 4/1986 | Boston | 426/106 |
| 4,665,130 A | 5/1987 | Hwo | 525/222 |
| 4,666,778 A | 5/1987 | Hwo | 428/412 |
| 4,759,984 A | 7/1988 | Hwo | 428/349 |
| 4,808,662 A | 2/1989 | Hwo | 525/74 |
| 4,810,541 A | 3/1989 | Newman et al. | 428/36.7 |
| 4,859,514 A | 8/1989 | Friedrich et al. | 428/36.6 |
| 4,870,134 A | 9/1989 | Hwo | 525/221 |
| 4,876,156 A | 10/1989 | Hwo | 428/516 |
| 4,882,229 A | 11/1989 | Hwo | 428/461 |
| 4,916,190 A | 4/1990 | Hwo | 525/227 |
| 5,036,140 A | 7/1991 | Hwo | 525/222 |
| 5,066,543 A | 11/1991 | Hwo | 428/412 |
| 5,084,360 A | 1/1992 | Young | 428/516 |
| 5,087,667 A | 2/1992 | Hwo | 525/222 |
| 5,128,414 A | 7/1992 | Hwo | 525/240 |
| 5,302,442 A | 4/1994 | O'Brien et al. | 428/213 |
| 5,547,752 A | 8/1996 | Yanidis | 428/349 |
| 5,889,121 A | * 3/1999 | Hwo et al. | 525/240 |

* cited by examiner

Primary Examiner—Nathan M. Nutter
(74) Attorney, Agent, or Firm—Caesar, Rivise Bernstein, Cohen & Pokotilow, Ltd.

(57) ABSTRACT

A packaging film or sheet which is capable of forming peel seals having acceptable seal strengths, is disclosed which includes a polymer mixture consisting of a blend having proportionate amounts of from about 60 percent by weight to about 70 percent by weight of LDPE; from about 15 percent by weight to about 25 percent by weight of mLLDPE; and from about 10 percent by weight to about 20 percent by weight of 1-polybutylene.

12 Claims, No Drawings

PEEL SEAL BLEND OF 1-POLYBUTYLENE, M-LLDPE AND LDPE WITH HIGH HOT TACK

FIELD OF THE INVENTION

The invention relates generally to seals for packages. More specifically, the invention relates to peelable seals needed for packages of perishable goods such as coffee.

BACKGROUND OF INVENTION

A peelable seel is the seal or joint between two films produced by heat sealing or impulse sealing, the joint thus formed having the property of being able to open in the original plane of joining of the two films by the action of a pulling force, without wrenching off or tearing occurring in the material of the two films used to make up the joint. For purposes of the present invention, the peelable seal must possess a mechanical resistance sufficient to maintain the wholeness and the tight-seal properties of the packing and wrapping during storage and transport until such time as the packing or wrapping is opened by the user of the article. The mechanical resistance of the peelable seal must be low enough to permit ready manual opening of the joint, i.e., without the use of any auxiliary instrument.

In recent years, packaging machine designs have evolved such that more stress is placed on the just formed, still hot seals, thus requiring the packaging material to have higher hot tack performance to maintain seal hermeticity. In addition, packaging machine speeds have increased which in turn sacrifices time allowed to form a seal, resulting in the need to decrease the temperature required to form a seal. Further, many of these machines require precise control of the coefficient of friction of the sealant to provide a consistent drag over stationary machine components. Still further, it is desirable to form a strong heat seal of a degassing valve to the peel seal material.

The prior art discloses various blends of polymers used to form peel seals. These blends only partially provide the full range of properties necessary for a peel seal package, for example for coffee, in accordance with the objects of the present invention. For example, U.S. Pat. No. 4,252,846 (Romesberg) discloses a blend of ethylene vinyl acetate (EVA) copolymer and high density polyethylene (HDPE). While this blend may peel, the hot tack properties are not addressed and are therefore likely to be poor. Here, the peel seal is taught that has a wide sealing temperature range with minimum variance in the seal value from a selected peel strength. Here, the range is approximately plus or minus ten degrees Fahrenheit from the control sealing temperature.

U.S. Pat. No. 4,665,130 (Hwo) discloses a film made from a blend of polypropylene, polyethylene and polybutylene. Here, the desired product has increased optical clarity such as low percent haze, for use with foodstuffs or medical products wrapped in transparent films. While this blend may peel, the hot tack properties again are not addressed and likely to be poor.

U.S. Pat. No. 4,666,778 (Hwo) discloses a film made from a blend of polypropylene, polyethylene and polybutylene. Again, a primary goal of this invention is to make a seal which exhibits good optical qualities, such as low percent haze, required, for example, for foodstuffs. While this blend may peel, the hot tack properties again are not addressed and likely to be poor.

U.S. Pat. No. 4,759,984 and 4,808,662 (both Hwo) disclose extrusion coating of polycarbonate or nylon film with a blend of polybutylene, ethylene vinyl acetate and polypropylene to form a peel seal. Here, the primary goal of these inventions is to avoid delamination layers when the sealed layers are pulled apart and utilizes a tie adhesive to bind incompatible substrates with sealants without the need for additional equipment to bind the adhesive between the sealant and the substrate. While this blend may peel, the hot tack properties are not specifically addressed and therefore are likely to be poor.

U.S. Pat. No. 4,810,541 (Newman) discloses a peel seal blend of polybutylene, ethylene vinyl acetate and polyethylene for producing the flange of a plastic container to which a lid is peelably sealed. The invention is in the area of rigid packages and is not applicable to this invention.

U.S. Pat. No. 4,859,514 (Friedrich) discloses a blend of EVA/EBC/PP designed to seal and peel from an ionomer or ionomer/EVA blend. This invention is not applicable since the subject invention is not designed to seal and peel to/from itself.

U.S. Pat. No. 4,870,134 (Hwo) discloses a blend of ethylene-carboxylic copolymer, butene-1, and polypropylene for forming easy opening packages. This blend may pose problems with consistent coefficient of friction since ethylene-carboxylic copolymer more readily absorbs compounds such as oleamide or erucamide. Furthermore, there is no disclosure regarding the hot tack properties of the blend.

U.S. Pat. No. 4,876,156 (Hwo) discloses a blend using a higher percentage of butene-1 than polyethylene and is therefore not applicable. Here, the important aspect of this invention is to provide a wrapping or packing material having easy peelability at the seal and yet which will bond to polypropylene without the aid of an adhesive and which are retortable at a temperature of 250 degrees Fahrenheit or above.

U.S. Pat. No. 4,882,229 (Hwo) discloses a blend of high molecular weight polybutylene and polyethylene to form a peel seal which has clean peel properties and is therefore not applicable. The product here is peelable at the seal and bonds to polypropylene without the aid of an adhesive, and will bond to other substrates using a tie layer adhesive having a clean sealing surface with few "angel hairs" contained therein upon opening of a sealed area.

U.S. Pat. No. 4,916,190 (Hwo) discloses a blend of polyethylene, polypropylene and polybutylene for retortable peel seal packaging and is therefore not applicable. Again, this wrapping or packing material has easy peelability at the seal and yet which will bond to polypropylene without the aid of an adhesive and which is retortable at temperatures of 250 degrees Fahrenheit or above.

U.S. Pat. No. 5,036,140 (Hwo) discloses a peel seal blend of polyethylene, polypropylene and polybutylene for extrusion lamination to polypropylene without adhesive. Again, this is not applicable to the subject invention. Here, the wrapping or packing material has easy peelability at the seal and bonds to polypropylene without the aid of an adhesive.

U.S. Pat. No. 5,066,543 (Hwo) discloses a peel seal blend with improved hot tack. The blend of EAA, polybutylene and polyethylene will indeed provide good hot tack. It has been our experience that these blends do not provide consistent peel seal strength and consistent slip properties.

U.S. Pat. No. 5,084,360 (Young) discloses a blend of polypropylene and two different butylene/ethylene copolymers to form a peel seal layer on oriented polypropylene. The application is in flexible packaging in the general field of snacks and confection. The blend is designed for peel seal, higher hot tack, and adhesion to polypropylene. The blend will likely have very poor adhesion to polyethylene and EVA copolymers since these two materials are lacking in this blend. Therefore, degassing valve seal strength will be poor.

U.S. Pat. No. 5,087,667 (Hwo) discloses a peel seal blend of polyethylene, polypropylene and polybutylene designed to bond to polypropylene without adhesive. Again, this is not applicable to the subject invention. Here, again, a wrapping or packing material has easy peelability at the seal and yet bonds to polypropylene without the aid of an adhesive.

U.S. Pat. No. 5,128,414 (Hwo) discloses a peel seal blend of polyethylene, polypropylene and polybutylene designed to bond to polypropylene without adhesive. Again this is not applicable to the subject invention. Here, again, a wrapping or packing material has easy peelability at the seal and yet bonds to polypropylene without the aid of an adhesive.

U.S. Pat. No. 5,302,442 (O'Brien) discloses a peel seal blend of polyethylene, polypropylene and polybutylene designed for co-extrusion with polypropylene and subsequent orientation. Again, this is not applicable to the subject invention.

U.S. Pat. No. 5,547,752 (Yanidis) discloses a peel seal blend of polybutylene and ionomer. This blend will likely have unacceptable coefficient of friction properties and, for example, will not likely seal to a degassing valve.

The prior art discloses various blends of polymers to form peel seals. These blends only partially provide the full range of properties necessary for a peel seal package for, for example, coffee. This invention provides all of the properties-higher hot tack, consistent peel seal to itself, lower seal initiation temperature, consistent coefficient of friction, low residual odor, and strong coffee valve seal.

OBJECTS OF THE INVENTION

It is a general object of this invention to provide a peel seal blend which addresses the needs of the prior art.

It is a further object of this invention to provide a peel seal blend having a high hot tack.

It is still a further object of this invention to provide a peel seal blend having consistent peel seal to itself.

It is yet a further object of this invention to provide a peel seal blend having a low seal initiation temperature.

It is a further object of this invention to provide a peel seal blend having a consistent coefficient of friction to provide consistent drag over stationary machine components.

It is still a further object of this invention to provide a peel seal blend having low residual odor.

It is yet a further object of this invention to provide a peel seal blend that provides for decreased time in forming a seal during manufacturing such that allowance is made for increased packaging machine speeds.

Finally, it is a further object of this invention to provide a peel seal blend providing for a strong coffee valve seal.

SUMMARY OF THE INVENTION

A blend of 1-polybutylene, m-LLDPE (linear low density polyethylene) and LDPE (low density polyethylene) was developed to produce film and laminate able to form a package with hermetic peelable seals with high hot tack strength and low seal initiation temperature. Hermetic peelable seals are needed for packages of perishable goods such as coffee. Seal hermeticity is required to prevent the ingress of oxygen or other deleterious compounds into the package through the seals. Prelability of the seal is desired for ready access to the product through hand manipulation of the seal.

A packaging film or sheet which is capable of forming peel seals having acceptable seal strengths, is disclosed which includes a polymer mixture consisting of a blend having proportionate amounts of from about 60 percent by weight to about 70 percent by weight of LDPE; from about 15 percent by weight to about 25 percent by weight of mLLDPE; and from about 10 percent by weight to about 20 percent by weight of 1-polybutylene.

The blend may form the inside sealant layer of a multi-layer flexible co-extruded film which includes the inside sealant layer and at least one additional laminar layer.

The substrate layer adjacent the inside sealant layer may be a polyethylene layer of, for example, LDPE, LLDPE, HDPE, or anhydride modified LLDPE.

The substrate layer adjacent the inside sealant layer may also be an olefin based material layer of, for example, an EVA copolymer, mLLDPE or MDPE.

The inside sealant layer is preferably less than about 0.001 inches thick and most preferably about 0.0003 inches thick.

The blend may include 1000 to 10,000 ppm of diatomaceous earth or silica to add microscopic roughness to aid in processing.

The blend may also include approximately 100 to 2000 ppm of fatty amides to modify the coefficient of friction of the blend also to aid in processing.

DETAILED DESCRIPTION OF THE PREFERRED EMBODIMENT

Three primary resins are used to form the peel seal material with high hot tack and low seal initiation temperature. The first is 1-polybutylene (PB; also known as 1-polybutene) which, when blended with polyethylene, forms a peelable seal. The second is an ethylene-based plastomer (mLLDPE) that provides very high hot tack. The third is low density polyethylene (LDPE) which, when blended with 1-polybutylene, forms a peelable seal. The three primary resins of this peel seal blend are preferably gravimetrically measured and dry blended. The blend is preferably gravity fed into one extruder of a multi-layer co-extrusion line. The subject blend forms the inside sealant layer of a multi-layer film. This multi-layer film may be used as is for packaging goods such as breakfast cereal or may be further laminated to other films. The construction of the co-extrusion will vary dependent on the end use. The lamination is dependent upon many factors such as package barrier, durability and machinability requirements.

The three primary resins used in this invention are readily obtainable. For example, a PB resin may be used which is currently produced and sold by Montell Polyolefins. For example, Montell PB grade PB 8640 may be used.

Exxon produces a variety of polyolefin materials, as do many other chemical companies. For example, the mLLDPE component may be Exxon Exact 3132. This resin has high hot tack, low melting point and melt index similar to the other two resins.

Exxon LD-104 may be the LDPE component of the blend. LD-104 has high stiffness and ease of extrusion processing.

The blend ratio of the three component peel seal provides higher hot tack than previous materials, lower seal initiation temperature than previous materials, and peel seal strength of approximately 0.6 kg./15 mm. Experimentation with blend ratio proved that the target peel seal strength was obtained with the following blend:

| | | |
|---|---|---|
| 65% | LDPE | (Exxon LD-104 (LDPE)) |
| 20% | mLLDPE | (Exxon Exact 3132) |
| 15% | 1-polybutylene | (Montell PB 8640) |

Varying these percentages by about +/−5 percentage points also yields acceptable results in accordance with the objects of the present invention. The general effect the amount of each component has on the hot tack, seal initiation temperature and peel seal strength of the blend is as follows:

EFFECT OF COMPONENT QUANTITY ON BLEND PROPERTIES

| MATERIAL | HOT TACK STRENGTH | SEAL INITIATION TEMPERATURE | PEEL STRENGTH |
|---|---|---|---|
| MORE LDPE | DECREASES | INCREASES | INCREASES |
| MORE mLLDPE | INCREASES | DECREASES | INCREASES |
| MORE PB | DECREASES | INCREASES | DECREASES* |

*Substantial increases in 1-polybutylene (over 50% of the total) will eventually increase seal strength.

The peel seal effect is caused by the cohesive strength of the three-component mixture. The PB component is somewhat immiscible with the mLLDPE and LDPE. The mixture tends to break at the interface of the PB and the mLLDPE/LDPE. When the subject blend is used in a co-extrusion, it is important to choose a suitable second layer material to which the blend has better adhesion than the cohesion of the blend itself, otherwise the blend will strip off of the second substrate. Second co-extruded substrates found to have the needed adhesion with the subject blend include LDPE, LLDPE, HDPE and anhydride modified LLDPE. It is likely that other olefin based materials such as EVA copolymer, mLLDPE and MDPE will also perform in an acceptable manner as secondary co-extruded materials.

For best results, the blend must be less than approximately 0.001 inches thick on the carrier to avoid "angel hair", i.e. a stringing effect of the blend as it is peeled. Optimally, the thickness of the blend should be approximately 0.0003 inches thick.

Three of the typical co-extruded films produced for testing were:

| | |
|---|---|
| Layer 6 (Outside) | 12μ polyester film |
| Layer 5 | 2μ polyurethane adhesive |
| Layer 4 | 7μ aluminum foil |
| Layer 3 | 2μ polyurethane adhesive |
| Layer 2 | 81μ 70% LLDPE/30% LDPE |
| Layer 1 (Inside) | 8μ 65% LDPE/20% mLLDPE/15% PB |
| Layer 8 (Outside) | 12μ polyester film |
| Layer 7 | 2μ polyurethane adhesive |
| Layer 6 | 7μ aluminum foil |
| Layer 5 | 2μ polyurethane adhesive |
| Layer 4 | 12μ polyester film |
| Layer 3 | 2μ polyurethane adhesive |
| Layer 2 | 68μ 70% LLDPE/30% LDPE |
| Layer 1 (Inside) | 8μ 65% LDPE/20% mLLDPE/15% PB |
| Layer 7 (Outside) | 12μ polyester film |
| Layer 6 | 2μ polyurethane adhesive |
| Layer 5 | 64μ 80% LLDPE/20% LDPE |
| Layer 4 | 8μ 100% anhydride modified LLDPE |
| Layer 3 | 10μ 100% ethylene vinyl alcohol copolymer |
| Layer 2 | 8μ 100% anhydride modified LLDPE |
| Layer 1 (Inside) | 12μ 65% LDPE/20% mLLDPE/15% PB |

Co-extruded film #2 is suitable for use as is for the inner box liner of dry ready to eat cereal. All three materials may find a use as unsupported co-extruded packaging films but we have produced them for use in laminations.

Typical laminations include:

| | |
|---|---|
| Layer 6 (Outside) | 12μ polyester film |
| Layer 5 | 2μ polyurethane adhesive |
| Layer 4 | 7μ aluminum foil |
| Layer 3 | 2μ polyurethane adhesive |
| Layer 2 | 81μ 70% LLDPE/30% LDPE |
| Layer 1 (Inside) | 8μ 65% LDPE/20% mLLDPE/15% PB |
| Layer 8 (Outside) | 12μ polyester film |
| Layer 7 | 2μ polyurethane adhesive |
| Layer 6 | 7μ aluminum foil |
| Layer 5 | 2μ polyurethane adhesive |
| Layer 4 | 12μ polyester film |
| Layer 3 | 2μ polyurethane adhesive |
| Layer 2 | 68μ 70% LLDPE/30% LDPE |
| Layer 1 (Inside) | 8μ 65% LDPE/20% mLLDPE/15% PB |
| Layer 7 (Outside) | 12μ polyester film |
| Layer 6 | 2μ polyurethane adhesive |
| Layer 5 | 64μ 80% LLDPE/20% LDPE |
| Layer 4 | 8μ 100% anhydride modified LLDPE |
| Layer 3 | 10μ 100% ethylene vinyl alcohol copolymer |
| Layer 2 | 8μ 100% anhydride modified LLDPE |
| Layer 1 (Inside) | 12μ 65% LDPE/20% mLLDPE/15% PB |

The above three laminations are suitable for packaging products requiring high barrier to oxygen such as roasted coffee.

Certain additives are useful in modifying properties other than sealing properties of the peelable blend. Examples of some of the properties which can be modified are coefficient of friction, resistance to blocking, UV stability, thermal stability and color. Diatomaceous earth or silica may be added in the amount of 1,000 parts per million (ppm) to 10,000 ppm to add microscopic surface roughness which prevents sticking or "blocking" when the co-extruded blend side (layer 1) is wound against the opposite side in a roll. Fatty amides such as oleamide or erucamide may be added to modify the coefficient of friction of the material. The amount added is dependent on the coefficient of friction desired, the co-extrusion structure, lamination structure and co-extrusion thickness. In general, the amount of fatty amide required is 100 ppm to 2000 ppm.

Degassing valves are well known in the flexible packaging of coffee. The vast majority of these valves are composed of polyethylene or EVA copolymer and are welded to the inside surface of the coffee bag. This same inside surface in many cases must also provide peel seal opening. The peel seal blend of this invention will readily heat seal to the valve and form a strong weld.

Lamination is carried out in such a way that the two film components can not subsequently be separated by peeling along the interface at which the components were laminated. Any such composite film may include two or more component films that are bonded together by any suitable means, including adhesive bonding; reactive surface modification (e.g., corona treatment, flame treatment, or plasma treatment); heat treatment; pressure treatment; etc., including combinations thereof.

While the invention has been described in detail and with reference to specific examples thereof, it will be apparent to one skilled in the art that various changes and modifications can be made therein without departing from the spirit and scope thereof.

What is claimed is:

1. A packaging film or sheet which is capable of forming peel seals having acceptable seal strengths, comprising a polymer mixture consisting of a blend having proportionate amounts of from about 60 percent by weight to about 70 percent by weight of LDPE; from about 15 percent by weight to about 25 percent by weight of mLLDPE; and from about 10 percent by weight to about 20 percent by weight of 1-polybutylene.

2. The packaging film or sheet of claim 1 wherein the packaging film or sheet is a multi-layer flexible co-extruded film and wherein the blend forms the inside sealant layer of the multi-layer flexible co-extruded film and wherein the film comprises at least one additional laminar layer.

3. The packaging film or sheet of claim 2, where a substrate layer adjacent the inside sealant layer is a polyethylene layer.

4. The packaging film or sheet of claim 3, wherein the polyethylene layer is a layer selected from the group consisting of LDPE, LLDPE, HDPE, and anhydride modified LLDPE.

5. The packaging film or sheet of claim 2, wherein a substrate layer adjacent the inside sealant layer is an olefin based material layer.

6. The packaging film or sheet of claim 5, wherein the olefin based material layer is a layer selected from the group consisting of EVA copolymer, mLLDPE and MDPE.

7. The packaging film or sheet of claim 2 wherein the inside sealant layer is less than about 0.001 inches thick.

8. The packaging film or sheet of claim 2 wherein the inside sealant layer is approximately 0.0003 inches thick.

9. The packaging film or sheet of claim 1, wherein the blend comprises 1000 to 10,000 ppm of diatomaceous earth or silica.

10. The packaging film or sheet of claim 1, wherein the blend further includes approximately 100 to 2000 ppm of fatty amides to modify the coefficient of friction of the blend.

11. The packaging film or sheet of claim 1, wherein the peel seal strength is approximately 0.6 kg/15 mm.

12. A packaging film or sheet which is capable of forming peel seals having acceptable seal strengths, comprising a polymer mixture consisting of a blend having proportionate amounts of 65 percent by weight of LDPE; about 20 percent by weight of mLLDPE; and about 15 percent by weight of 1-polybutylene.

* * * * *